(12) United States Patent
Nakamura

(10) Patent No.: US 10,440,201 B2
(45) Date of Patent: Oct. 8, 2019

(54) FACSIMILE APPARATUS, PROGRAM AND COMMUNICATION SERVER PROVIDING SERVER-ENABLED FACSIMILE MESSAGE TRANSMISSION

(71) Applicant: BROTHER KOGYO KABUSHIKI KAISHA, Nagoya-shi, Aichi-ken (JP)

(72) Inventor: Kuniki Nakamura, Gifu (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/865,920

(22) Filed: Sep. 25, 2015

(65) Prior Publication Data

US 2016/0094732 A1 Mar. 31, 2016

(30) Foreign Application Priority Data

Sep. 29, 2014 (JP) .................................. 2014-198602

(51) Int. Cl.
*H04N 1/00* (2006.01)
*H04N 1/32* (2006.01)

(52) U.S. Cl.
CPC ..... *H04N 1/00244* (2013.01); *H04N 1/00307* (2013.01); *H04N 1/3209* (2013.01);
(Continued)

(58) Field of Classification Search
None
See application file for complete search history.

(56) References Cited

U.S. PATENT DOCUMENTS 5,301,035 A * 4/1994 Hayafune ............ H04N 1/0035
358/403
2003/0046354 A1 * 3/2003 Mizuno .................. H04L 51/24
709/206

(Continued)

FOREIGN PATENT DOCUMENTS

JP 8-119554 A 5/1996
JP 2000-115494 A 4/2000
(Continued)

OTHER PUBLICATIONS

Japanese Office Action issued in related Japanese patent application No. 2014-198602, dated Jan. 23, 2018.

*Primary Examiner* — Lennin R Rodriguezgonzalez
(74) *Attorney, Agent, or Firm* — Merchant & Gould P.C.

(57) ABSTRACT

A facsimile apparatus is provided with: a first interface; a second interface configured to establish a connection to a network; a processor; and memory storing computer readable instructions that, when executed by the processor, causing the apparatus to perform: inquiry processing of making an inquiry to a communication server through the second interface; facsimile-side determination processing of determining whether an image file and transmission information are associated with identification information and stored in the communication server; acquisition processing of, when it is determined in the facsimile-side determination processing that image file and the transmission information are stored in the communication server by being associated with the identification information, acquiring the image file and the transmission information from the communication server through the second interface; and transmission processing of transmitting facsimile data including the image file to another facsimile apparatus specified by the transmission information through the first interface.

21 Claims, 9 Drawing Sheets

(52) U.S. Cl.
CPC ............... *H04N 2201/007* (2013.01); *H04N 2201/0039* (2013.01); *H04N 2201/0093* (2013.01); *H04N 2201/0094* (2013.01)

(56) References Cited

U.S. PATENT DOCUMENTS

| | | |
|---|---|---|
| 2006/0143286 A1 | 6/2006 | Aoki et al. |
| 2007/0050616 A1 | 3/2007 | Masui et al. |
| 2007/0223034 A1* | 9/2007 | Matsumoto ........... G06F 3/1204 358/1.15 |
| 2007/0237314 A1* | 10/2007 | Henry .................. G06Q 10/107 379/100.08 |
| 2008/0007790 A1* | 1/2008 | Fujita ................ H04N 1/00244 358/400 |
| 2009/0005023 A1 | 1/2009 | Toorn |
| 2010/0002255 A1* | 1/2010 | Fukushima ........ H04N 1/00206 358/1.15 |
| 2011/0087724 A1* | 4/2011 | Haga ................. H04N 1/00244 709/202 |

FOREIGN PATENT DOCUMENTS

| | | |
|---|---|---|
| JP | 2000-151834 A | 5/2000 |
| JP | 2002-158770 A | 5/2002 |
| JP | 2006-134110 A | 5/2006 |
| JP | 2007-60187 A | 3/2007 |
| JP | 2009-501466 A | 1/2009 |
| JP | 2010-061225 A | 3/2010 |
| JP | 2014-120899 A | 6/2014 |

* cited by examiner

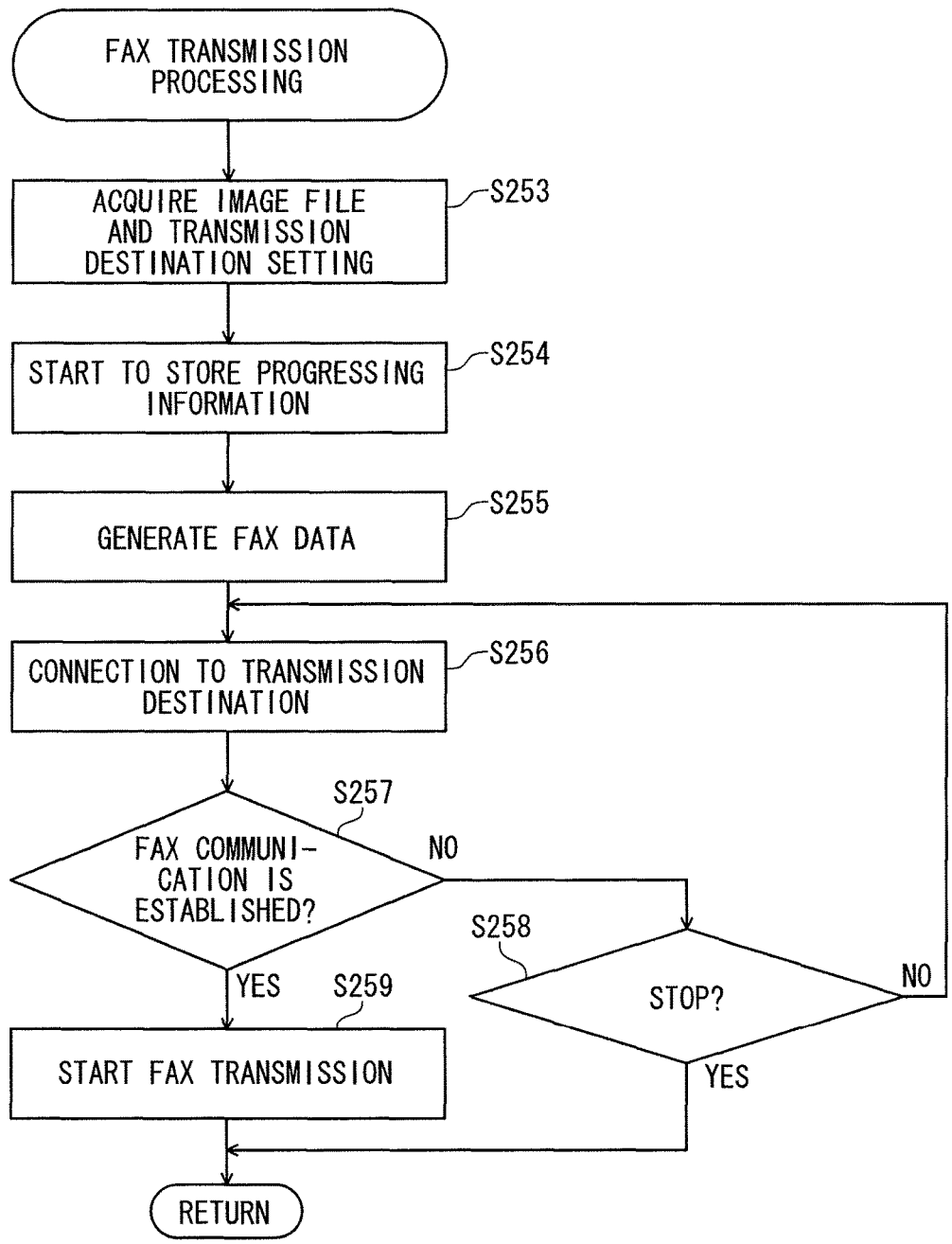

FACSIMILE APPARATUS, PROGRAM AND COMMUNICATION SERVER PROVIDING SERVER-ENABLED FACSIMILE MESSAGE TRANSMISSION

CROSS-REFERENCE TO RELATED APPLICATION

This application claims priorities from Japanese Patent Application No. 2014-198602 filed on Sep. 29, 2014, the entire subject matters of which is incorporated herein by reference.

TECHNICAL FIELD

The present disclosure relates to a facsimile apparatus, a program, and a communication server.

BACKGROUND

In the related art, a system including an information processing apparatus, a facsimile apparatus and a server has been known. The system discloses a configuration where the server acquires an image received by the facsimile apparatus, and a mobile device acquires and displays the image from the server, and a configuration where the mobile device receives a text for reply to the image and transmits the same to the server, and the server transmits facsimile data, in which the text and the image are overlapped, to the facsimile apparatus.

SUMMARY

The facsimile apparatus is configured to simply receive the reply to the received facsimile data from the server and it is not possible to perform facsimile transmission to a facsimile apparatus of a transmission destination having not received facsimile data.

The present disclosure has been made in view of the above circumstances, and one of objects of the present disclosure is to provide a configuration capable of increasing a degree of freedom when facsimile transmission is enabled to perform facsimile transmission from an information processing apparatus via a server.

According to an illustrative embodiment of the present disclosure, there is provided a facsimile apparatus including: a first interface configured to perform facsimile communication; a second interface configured to establish a connection to a network; a processor; and memory storing computer readable instructions that, when executed by the processor, causing the apparatus to perform: inquiry processing of making an inquiry to a communication server through the second interface; facsimile-side determination processing of determining whether an image file as a data to be transmitted and transmission information including destination information to which the image file is to be transmitted by the facsimile apparatus are associated with identification information for identifying the facsimile apparatus and stored in the communication server, the image file and the transmission information being stored in the communication server in accordance with an operation of an information processing apparatus by a user; acquisition processing of, when it is determined in the facsimile-side determination processing that image file and the transmission information are stored in the communication server by being associated with the identification information, acquiring the image file and the transmission information from the communication server through the second interface; and transmission processing of transmitting facsimile data including the image file to another facsimile apparatus specified by the transmission information through the first interface.

According to another illustrative embodiment of the present disclosure, there is provided a non-transitory computer readable recording medium storing computer readable instructions for an information processing apparatus that is provided with a processor, wherein the instructions, when executed by the processor, causing the information processing apparatus to perform: image selection processing of selecting an image file as a transmission target of facsimile transmission; transmission source acquisition processing of acquiring identification information of a transmission source facsimile apparatus, which is a facsimile apparatus of a transmission source of the facsimile transmission; setting processing of setting transmission information including destination information of a transmission destination facsimile apparatus, which is a facsimile apparatus of a transmission destination of the facsimile transmission; and storing processing of storing, in a storage area of a communication server, the image file selected in the image selection processing and the transmission information set in the setting processing in association with the identification information acquired in the transmission source acquisition processing.

According to still another illustrative embodiment of the present disclosure, there is provided a communication server including: an interface that is capable of establishing an Ethernet communication; a storage unit; a processor; and memory storing computer readable instructions that, when executed by the processor, causing the communication server to perform: allocating processing of allocating, in the storage unit based on identification information for identifying a facsimile apparatus, a storage area in which transmission information including destination information indicating transmission destination of a facsimile transmission from the facsimile apparatus and an image file to be transmitted by the facsimile transmission; server storing processing of acquiring the transmission information and the image file from an information processing apparatus through the interface and storing transmission information in the storage area; and server transmission processing of, after the information processing apparatus receives a facsimile transmission instruction, transmitting the image file and the transmission information stored in the storage area to the facsimile apparatus through the interface.

BRIEF DESCRIPTION OF THE DRAWINGS

In the accompanying drawings:

FIG. 9 is a flowchart showing a sequence of facsimile transmission processing that is to be executed by the MFP.

DETAILED DESCRIPTION

Hereinafter, an image processing apparatus of an illustrative embodiment will be described in detail with reference to the accompanying drawings. In the illustrative embodiment, the present disclosure is applied to a facsimile communication system configured to instruct a facsimile apparatus to perform facsimile transmission from a mobile device.

Figure 1:
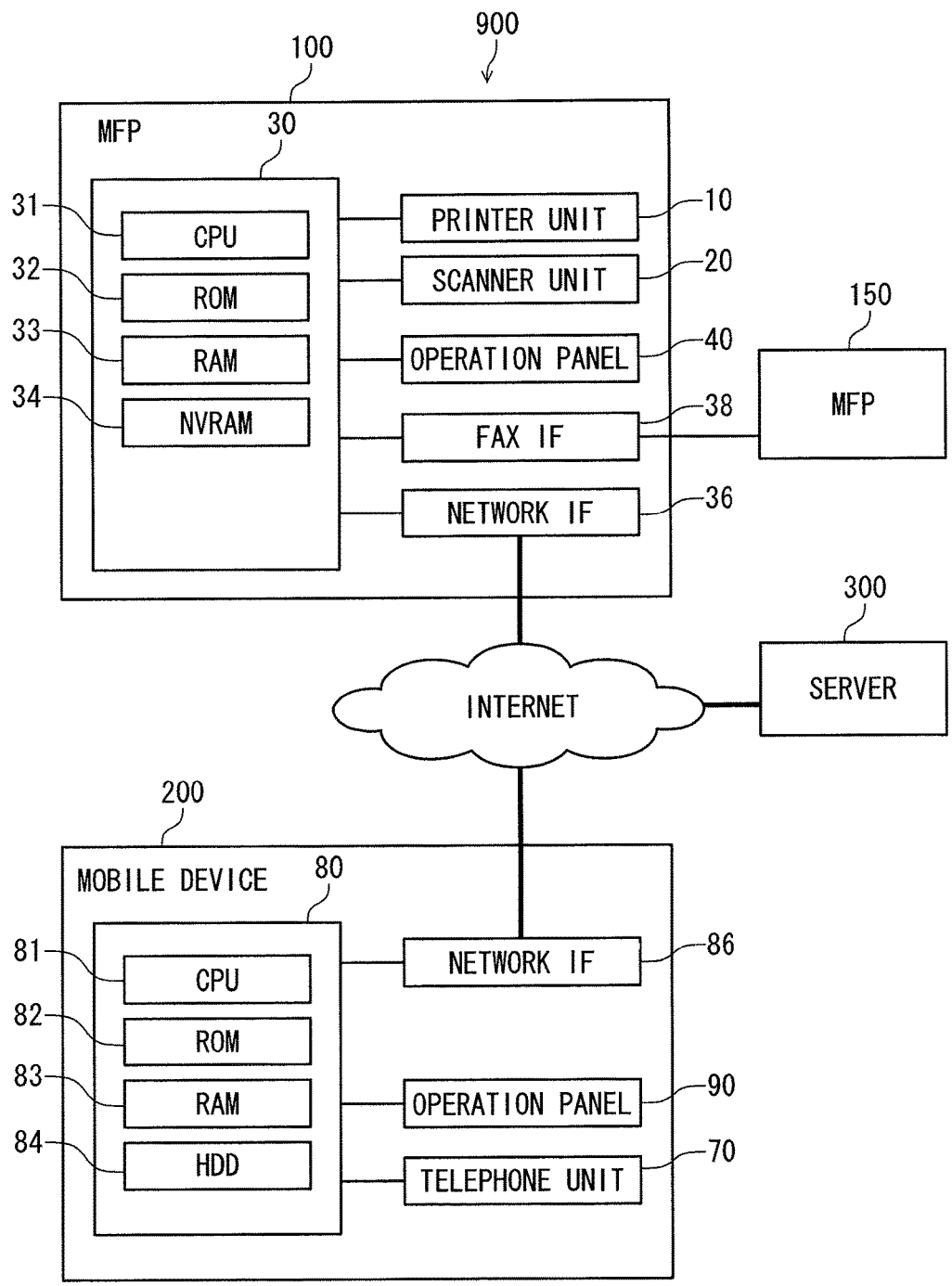
FIG. 1 is a block diagram showing a configuration of a facsimile apparatus and a facsimile communication system according to an illustrative embodiment.

As shown in FIG. 1, a facsimile communication system 900 of the illustrative embodiment includes a multi function peripheral (MFP) 100 having a facsimile function, a mobile device 200 and a server 300. The MFP 100, the mobile device 200, and the server 300 are connected via the Internet. Additional devices may also be connected to the Internet, in addition to the MFP 100 and the like. The MFP 100 is an example of the facsimile apparatus.

As the mobile device 200, a smart phone and a personal computer (PC) of a tablet type may be exemplified. The mobile device 200 is an example of the information processing apparatus. The server 300 is an example of the communication server.

The MFP 100 is capable to perform facsimile communication through a telephone line and can transmit data to an MFP 150 by the facsimile communication, for example. The MFP 100 is connected to the Internet and can transmit data between the MFP 100 and the server 300 and between the mobile device 200 and the server 300 through the Internet. The data transmission through the Internet may be performed by a wired or wireless method.

Subsequently, as the configuration of the facsimile apparatus included in the facsimile communication system 900 of the illustrative embodiment, a schematic configuration of the MFP 100 is described. In FIG. 1, although the configuration of the MFP 150 is omitted, the MFP 150 also has the same configuration as the MFP 100.

As shown in FIG. 1, the MFP 100 has a controller 30 having a CPU 31, a ROM 32, a RAM 33 and an NVRAM (non-volatile RAM) 34. The controller 30 in FIG. 1 is a collective term of the hardware that is to be used for control of the MFP 100, such as the CPU 31, and does not indicate only the single hardware actually provided for the MFP 100.

In the ROM 32, the firmware, which is a program for controlling the MFP 100, a variety of settings and initial values and the like are stored. The RAM 33 and NVRAM 34 are used as work areas from which a variety of control programs are read out or storage areas in which data is temporarily stored.

The CPU 31 is configured to control each component of the MFP 100 while storing processing results in the RAM 33 or NVRAM 34, in response to the control programs read out from the ROM 32 or signals transmitted from various sensors. The CPU 31 is an example of a control unit or a processor. The controller 30 may be an example of the control unit or the processor.

The MFP 100 has a printer unit 10 configured to print an image on a sheet, a scanner unit 20 configured to scan an image of a document, an operation panel 40 having both a display function and an input function, a network interface (network IF) 36, and a facsimile interface (FAX IF) 38, which are controlled by the CPU 31. The operation panel 40 is an example of a user interface.

The printer unit 10 may be configured to execute a color printing or only a monochrome printing. Also, a printing method may be an electrophotographic method or an inkjet method. The scanner unit 20 may be configured to execute a color scanning or only a monochrome scanning. Also, a scanning mechanism may be a CCD or a CIS.

The network interface 36 is hardware connected to a network such as the Internet and configured to perform Ethernet (registered trademark) communication based on IEEE 802.3 standards and standards corresponding thereto. The network interface 36 may be connected to the Internet through wireless communication such as WiFi. The MFP 100 is configured to transmit data to the server 300 through the network interface 36. The network interface 36 is an example of a second interface.

The facsimile interface 38 is hardware having an NCU (network control unit) configured to control telephone line connection and a modem configured to modulate a voice signal and a digital signal, and configured to perform communication using a telephone line. The MFP 100 is configured to perform facsimile communication with another facsimile apparatus such as the MFP 150 through the facsimile interface 38. The facsimile interface 38 is an example of a first interface.

The operation panel 40 is provided on an outer surface of the MFP 100, and has a group of various buttons for receiving a user's input and a touch panel for displaying a message and various settings. The various buttons include a numeric keypad, arrow keys, an OK button and a cancel button, for example. Also, an input can be made by user's touching the touch panel. For example, the various settings and the user information are input through the touch panel.

Subsequently, a schematic configuration of the mobile device 200 included in the facsimile communication system 900 of the illustrative embodiment is described. As shown in FIG. 1, the mobile device 200 has a controller 80 having a CPU 81, a ROM 82, a RAM 83 and an HDD 84. The controller 80 in FIG. 1 is a collective term of the hardware that is to be used for control of the mobile device 200, such as the CPU 81, and does not indicate only the single hardware actually provided for the mobile device 200.

In the ROM 82, the firmware, which is a control program for controlling the mobile device 200, a variety of settings and initial values and the like are stored. The RAM 83 and HDD 84 are used as work areas from which a variety of control programs are read out or storage areas in which data is temporarily stored. Also, in the HDD 84, an application program (hereinafter, referred to as 'application') for inputting an instruction enabling the facsimile apparatus such as the MFP 100 to perform facsimile transmission by using a facsimile transmission service of the facsimile communication system 900 is stored.

The CPU 81 is configured to control each component of the mobile device 200 while storing processing results in the RAM 83 or NVRAM 84, in response to the control programs read out from the ROM 82 or signals transmitted from various sensors. A variety of processing that is to be executed by the application is also executed by the CPU 81.

The mobile device 200 has a telephone unit 70, an operation panel 90 having both a display function and an input function, and a network interface (network IF) 86, which are controlled by the CPU 81. The network interface 86 is hardware enabling Internet connection through at least wireless communication. The mobile device 200 is configured to transmit data to the server 300 through the network interface 86.

Figure 2:
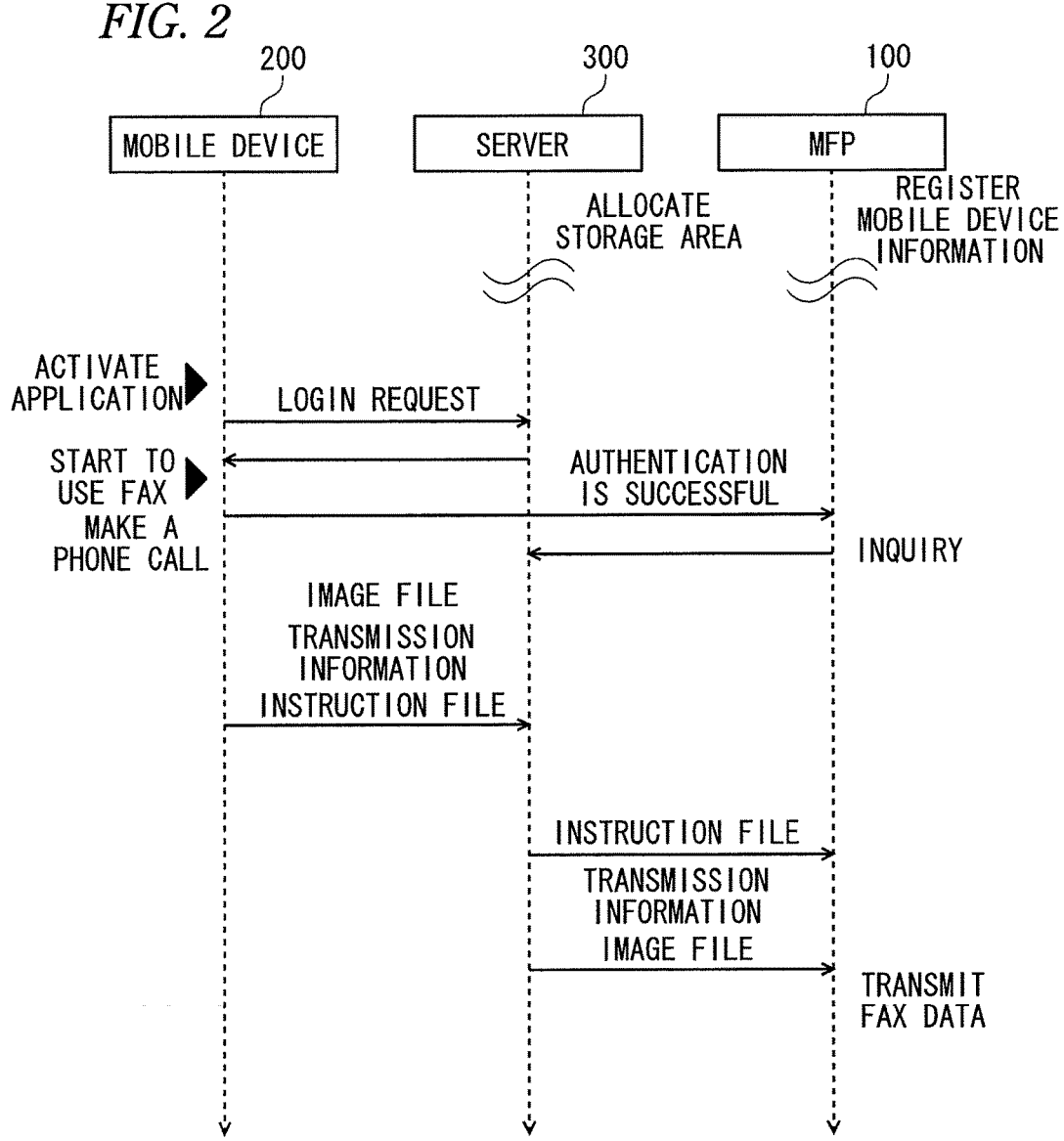
FIG. 2 is a sequence diagram of facsimile transmission of the facsimile communication system according to the illustrative embodiment.

Subsequently, operations of the facsimile transmission service of the facsimile communication system 900 are described with reference to a sequence diagram of FIG. 2 and a block diagram of FIG. 3. In this illustrative embodiment, a user of the mobile device 200 enables the MFP 100 to perform facsimile transmission to a facsimile apparatus of a transmission destination through the server 300. First, processing of registering in advance information for using the facsimile transmission service in the server 300 and the MFP 100 is described. Any of the registration to the server 300 and the registration to the MFP 100 may be made or both the registrations may be made at the same time.

Figure 3:
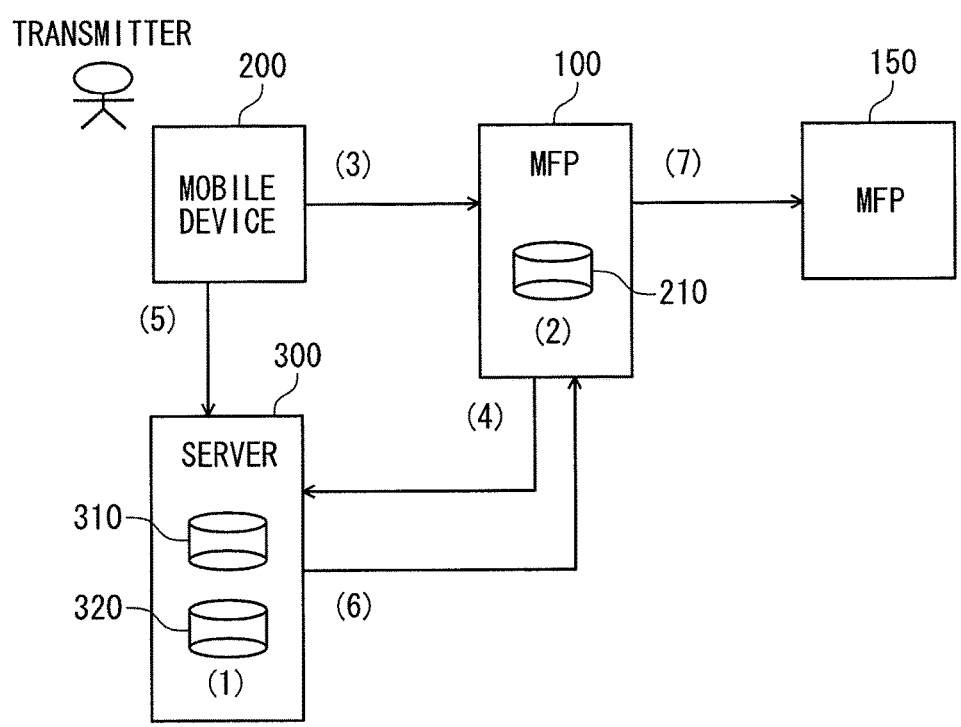
FIG. 3 is a block diagram showing an outline of the facsimile transmission of the facsimile communication system according to the illustrative embodiment.

As shown in FIG. 3, a memory of the server 300 is provided in advance with user information database (hereinafter, referred to as 'user DB') 310. The user DB 310 is a database configured to store therein registration information, which is input by a user so as to use the facsimile transmission service. Here, the registration information of the illustrative embodiment is a user ID, a password and an ID of the MFP 100. The user ID is information for specifying a user of the mobile device 200 who uses the facsimile transmission service. The password is information for authenticating the user when the user uses the service. As the ID of the MFP 100, a telephone number of the MFP 100 may be exemplified. The registration of the facsimile transmission service to the server 300 may be made by user's directly operating the server 300 or may be instructed from the external apparatus such as the mobile device 200, the MFP 100 and the like.

When the server 300 receives the registration of the facsimile transmission service, a storage area 320 for storing data associated with the user ID and the ID of the MFP 100 is allocated in a memory area of the server 300 (refer to (1) in FIG. 3). That is, according to the facsimile communication system 900, a storage area allotted for each login user and for each facsimile apparatus enabled to perform facsimile transmission is generated in the server 300, and the data is transmitted through each storage area. Whenever the new registration information is registered in the user DB 310, the server 300 allocates a new corresponding storage area.

When an ID of the MFP 100 is registered from the MFP 100 and the storage area 320 is allocated in the server 300, the MFP 100 stores apparatus information of the MFP 100 in the storage area 320. As the apparatus information, capability information of the facsimile transmission of the MFP 100, a telephone directory provided in the MFP 100, an outgoing/incoming call history provided in the MFP 100, and a transmitting and receiving history of facsimile communication provided in the MFP 100 may be exemplified. Also, as described later, since the MFP 100 is configured to make a periodic inquiry to the server 300, an inquiry interval at which the MFP 100 makes an inquiry to the server 300 or a time at which the MFP 100 makes an inquiry to the server 300 next time may be included as the apparatus information.

The MFP 100 is configured to receive registration of a telephone number of the mobile device 200 using the facsimile transmission service. The registration of the telephone number of the mobile device 200 to the MFP 100 may be made by user's directly operating the MFP 100 or may be instructed from the external apparatus such as the server 300.

As shown in FIG. 3, the NVRAM 34 of the MFP 100 is provided in advance with a facsimile transmission database (hereinafter, referred to as 'FAX transmission DB') 210. When the telephone number input by the user is received, the MFP 100 registers the input telephone number in the FAX transmission DB 210 (refer to (2) in FIG. 3). In the illustrative embodiment, it is assumed that the telephone number of the mobile device 200 is registered in the FAX transmission DB 210 of the MFP 100. The FAX transmission DB 210 is an example of the storage unit.

Subsequently, a sequence of performing facsimile transmission in the facsimile communication service of the illustrative embodiment is described with reference to FIG. 2. First, the mobile device 200 logs in the server 300, so that a login state is established between the mobile device 200 and the server 300.

Specifically, in order for the mobile device 200 to establish the login state with the server 300, the application is first activated in the mobile device 200. The mobile device 200 receives a request to begin using the server 300 through the application. At this time, a login screen (not shown) requesting the user to input login information including a user ID, a password and an ID of a facsimile apparatus, which is enabled to perform facsimile transmission, i.e., the telephone number of the MFP 100, in the illustrative embodiment, is displayed on the operation panel 90 of the mobile device 200. The login user inputs the login information, in response to an instruction of the login screen. Then, the mobile device 200 receives the input user ID, password, and telephone number of the MFP 100, and transmits a login request including the login information to the server 300.

When the login request is received from the mobile device 200, the server 300 refers to the user DB 310 and determines whether the registration information matching the login information included in the login request is in the registration information registered in the user DB 310. When it is determined that there is the matching registration information, the server 300 transmits a notification of success, which indicates that this authentication is successful, to the mobile device 200. When the notification of success is received, the mobile device 200 displays an operation screen (not shown), on which a variety of settings for the facsimile transmission are made, on the operation panel 90. On the other hand, when it is determined that there is no matching registration information, the server 300 transmits a notification of failure, which indicates that this authentication fails, to the mobile device 200. When the notification of failure is received, the mobile device 200 again displays the login screen. The mobile device 200 may display a message, which requests the user to again input the login information.

After receiving the notification of success from the server 300, the mobile device 200 makes a phone call to the MFP 100 by using the telephone number of the MFP 100 included in the login information (refer to (3) in FIG. 3). Then, the mobile device 200 makes a call for a predetermined time period (for example, 2 seconds) and then disconnects a call.

When there is a missed call, the MFP 100 refers to the FAX transmission DB 210 and determines whether a telephone number matching the telephone number of the missed call is in the telephone information registered in the FAX transmission DB 210. When there is a matching telephone number, the MFP 100 starts to make a periodic inquiry to the server 300 (refer to (4) in FIG. 3). In the meantime, when the MFP 100 has already made a periodic inquiry to the server 300, an inquiry interval, which is an interval of the inquiry, is shortened.

Based on the inquiry, the MFP 100 determines whether an instruction file is stored in the storage area 320 associated with the telephone number of the MFP 100 and allocated in advance. The instruction file will be described in detail later.

Also, after receiving the notification of success from the server 300, the mobile device 200 receives a setting of the transmission information of the facsimile transmission, a selection of an image file to be a transmission target and an execution instruction of the facsimile transmission through the application. The transmission information may include a redial setting, a color designation, a setting of a transmission resolution, and an inquiry interval at which the MFP 100 makes an inquiry to the server 300, for example, in addition to the telephone number of the facsimile apparatus of the transmission destination. In the illustrative embodiment, it is assumed that the MFP 150 is set as the facsimile apparatus of the transmission destination. The image file may be a file becoming an image source of the transmission target, and may be document data such as text, in addition to image data such as JPEG, GIF and the like. The above settings are input through the operation screen displayed on the operation panel 90 by the user.

The set transmission information and the selected image file are transmitted to the server 300 and are stored in the storage area 320 in which the data associated with the login user and the MFP 100 is stored (refer to (5) in FIG. 3).

When the execution instruction of the facsimile transmission is received, the mobile device 200 generates an instruction file including a reading instruction of the image file and transmission information and an execution instruction of the facsimile transmission, and stores the instruction file in the storage area 320.

As described above, the MFP 100 is configured to determine whether the instruction file is stored in the storage area 320 whenever making a periodic inquiry to the server 300. When it is determined that the instruction file is stored in the storage area 320, the MFP 100 reads out the instruction file. Then, the MFP 100 acquires the image file and the transmission information from the storage area 320, in response to an instruction of the instruction file (refer to (6) in FIG. 3).

The MFP 100 having acquired the image file and transmission information further performs facsimile transmission in accordance with the instruction file (refer to (7) in FIG. 3). In the illustrative embodiment, since the MFP 150 is set as the facsimile apparatus of the transmission destination, the MFP 100 transmits by facsimile the image file to the MFP 150 by using the telephone number of the MFP 150 included in the transmission information. Thereby, for example, the user of the mobile device 200 distant from the MFP 100 can enable the MFP 100, which is designated by the user, to transmit by facsimile the user's desired image file through the server 300.

Figure 4:
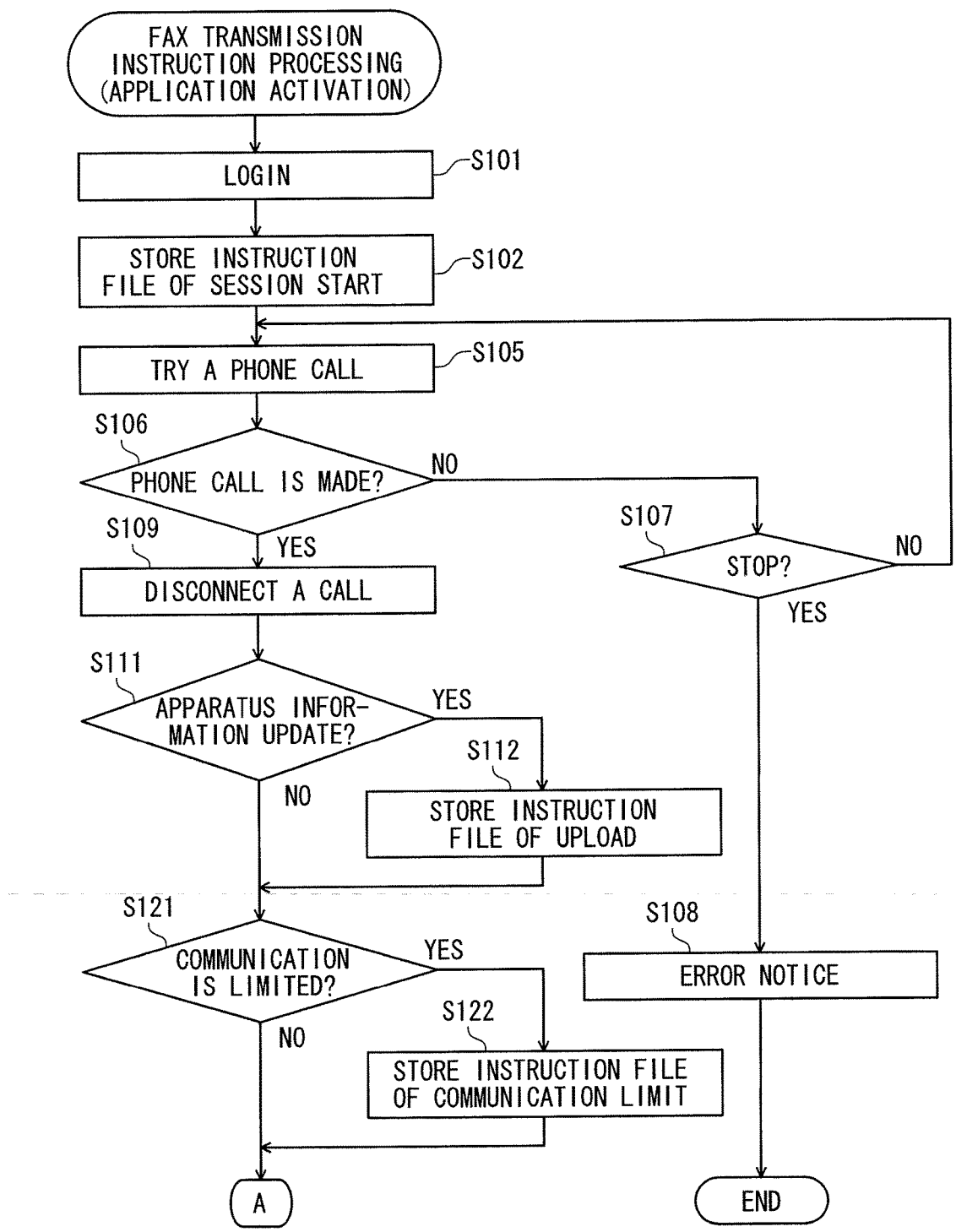
FIG. 4 is a flowchart showing a sequence (first half) of facsimile transmission instruction processing that is to be executed by a mobile device.
Figure 5:
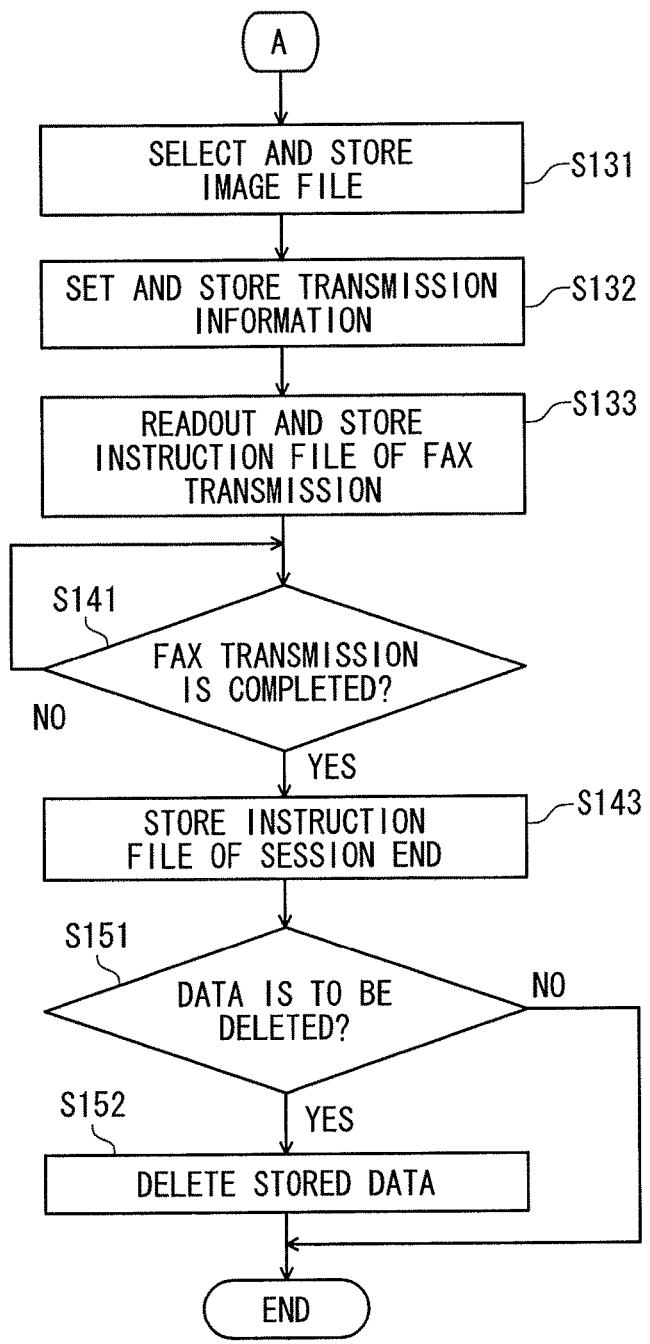
FIG. 5 is a flowchart showing a sequence (second half) of the facsimile transmission instruction processing that is to be executed by the mobile device.

Subsequently, the control of the mobile device 200 in the facsimile transmission service is described. First, a sequence of facsimile transmission instruction processing of instructing the facsimile transmission from the mobile device 200 is described with reference to flowcharts of FIGS. 4 and 5. The facsimile transmission instruction processing is executed by the CPU 81 when the application is activated.

In the facsimile transmission instruction processing, the mobile device 200 first logs in the server 300 (S101). As described above, the mobile device 200 enables the user to input, as the login information, the user ID, the password and the telephone number of the MFP 100 and transmits the login information to the server 300. Then, the mobile device 200 receives a notification of success from the server 300 and thus logs in the server 300. On the other hand, when the mobile device 200 receives a notification of failure from the server 300, the mobile device 200 again receives the login information or ends the facsimile transmission instruction processing. The processing of S101 is an example of the transmission source acquisition processing.

After S101, the mobile device 200 generates an instruction file in which the start of a session with the MFP 100 is instructed, and stores the instruction file in the storage area 320 (S102). When the instruction file is stored, the MFP 100 reads out the instruction file by the periodic inquiry of the MFP 100 to the server 300 and recognizes the start of the session.

After S102, the mobile device 200 tries a phone call based on the telephone number of the MFP 100, which is the telephone number designated by the login information (S105). The processing of S105 is an example of the phone call processing. Then, the mobile device 200 determines whether a phone call is made (S106).

When a phone call is not made due to call waiting, for example (S106: NO), the mobile device 200 determines whether or not to stop the phone call (S107). The determination as to whether or not to stop the phone call may be inquired to the user or may be made using preset information. When the phone call is not stopped, i.e., when continuing the phone call (S107: NO), the mobile device 200 returns to S105 and again tries a phone call. On the other hand, when stopping the phone call (S107: YES), the mobile device 200 has an error notification (S108) and ends the facsimile transmission instruction processing. As to the error notification, an error message may be displayed on the operation panel 90 or a voice guidance may be executed. In the meantime, when a phone call is not made even though the redialing is performed several times, the mobile device 200 may notify an error and end the facsimile transmission instruction processing. The processing of S107 (YES) is an example of the phone call stop processing, and the processing of S107 (NO) is an example of the phone call continuing processing.

When a phone call is made (S106: YES), the mobile device 200 makes a call for a predetermined time period and then disconnects a call (S109). The MFP 100 increases an inquiry frequency to the storage area 320 of the server 300, in response to the missed call from the mobile device 200.

After S109, the mobile device 200 determines whether or not to update the apparatus information of the MFP 100 (S111). The determination as to the update may be inquired to the user or may be preset.

The mobile device 200 stores therein the apparatus information of the MFP 100. The mobile device 200 can utilize the capability of facsimile transmission, for example, thereby avoiding to set an incapability setting in the transmission information settings. Also, it is possible to simply set a telephone number of a transmission destination of the facsimile transmission by acquiring the telephone directory. The mobile device 200 can acquire the apparatus information of the MFP 100 by instructing the MFP 100 to upload the apparatus information to the storage area 320 and reading the apparatus information from the storage area 320. The user can predict the file transmission timing by acquiring the timing at which the MFP 100 makes an inquiry to the server 300.

Therefore, when updating the apparatus information of the MFP 100 (S111: YES), the mobile device 200 generates an instruction file including an upload instruction of the apparatus information to the storage area 320 and stores the instruction file in the storage area 320 (S112). When the instruction file is stored, the MFP 100 reads out the instruction file and the latest apparatus information is stored in the storage area 320 by the MFP 100. The mobile device 200 updates the apparatus information by reading the latest apparatus information from the storage area 320.

After S112, or when the apparatus information of the MFP 100 is not updated (S111: NO), the mobile device 200 determines whether or not to limit the communication at the MFP 100 (S121). The determination as to the communication limit may be inquired to the user or may be preset.

When limiting the communication at the MFP 100 (S121: YES), the mobile device 200 generates an instruction file in which the limit of the facsimile communication is instructed, and stores the instruction file in the storage area 320 (S122). When the instruction file is stored, the MFP 100 reads out the instruction file and shifts to a limit mode in which the facsimile communication is limited. In the limit mode, the MFP 100 locks an incoming call from the external apparatus, locks the operation panel 40, and the like. Thereby, it is possible to avoid a situation where before the user of the mobile device 200 executes the facsimile transmission, the facsimile transmission is interrupted by another facsimile job and cannot be immediately performed.

After S122 or when the communication is not limited (S121: NO), the mobile device 200 shifts to FIG. 5, receives a selection of an image file, which is a facsimile transmission target and stores the selected image file in the storage area 320 by the application (S131). The mobile device 200 receives a setting of the transmission information of the facsimile transmission and stores the set transmission information in the storage area 320 (S132). In S132, the mobile device 200 sets the appropriate information based on the capability information of facsimile transmission included in the apparatus information of the MFP 100. The mobile device 200 may set the transmission destination of the facsimile transmission by referring to the telephone directory or the transmitting and receiving history of the MFP 100. Any processing of S131 and S132 may be earlier performed or both the processing may be performed at the same time. The processing of S131 is an example of the image selection processing and the storing processing, and the processing S132 is an example of the setting processing, the storing processing and the facsimile information display processing.

After S132, the mobile device 200 generates an instruction file including a readout instruction of the image file and transmission information and an image facsimile transmission instruction based on the read image file, and stores the instruction file in the storage area 320 (S133). When the mobile device 200 stores the instruction file in the storage area 320 of the server 300, the MFP 100 reads out the instruction file by the periodic inquiry of the MFP 100 to the server 300. Then, the MFP 100 reads out the image file and transmission information in accordance with the instruction file, generates an image for facsimile transmission based on the read image file, and starts the image facsimile transmission by using the telephone number of the transmission destination included in the transmission information. Thereby, based on the facsimile transmission instruction from the mobile device 200, the facsimile transmission is executed at the MFP 100. The image file and transmission information of the readout target are specified by the instruction file. For this reason, even when there is the plurality of the image file and transmission information in the storage area 320, the appropriate image file and transmission information are read out. The processing of S133 is an example of the storing processing.

After S133, the mobile device 200 determines whether the facsimile transmission by the MFP 100 is completed (S141). The MFP 100 stores the progressing information having a progress status of the facsimile transmission in the storage area 320, and the mobile device 200 can determine whether the facsimile transmission is completed by reading out the progressing information. The progressing information includes the error information and the completion information of the facsimile transmission, in addition to the progress status of the facsimile transmission. The completion of the facsimile transmission includes not only a case where the facsimile transmission is normally completed but also a case where the facsimile transmission is terminated due to an error. When the progressing information is not updated for a predetermined time period or longer, it may be considered that the facsimile transmission is completed. When the facsimile transmission is not completed (S141: NO), the mobile device 200 waits for the completion of the facsimile transmission.

When the facsimile transmission is completed (S141: YES), the mobile device 200 generates an instruction file including an ending instruction of the session, and stores the instruction file in the storage area 320 (S143). When the instruction file is stored, the MFP 100 reads out the instruction file by the periodic inquiry of the MFP 100 to the server 300, and executes processing of releasing the limit mode, and the like.

After S143, the mobile device 200 determines whether or not to delete the data stored in the storage area 320 (S151). The determination as to whether to delete the data may be inquired to the user or may be made using the preset information. When deleting the data (S151: YES), the mobile device 200 deletes all the data stored in the storage area 320 (S152). After S152 or when the data is not deleted (S151: NO), the mobile device 200 ends the facsimile transmission instruction processing.

The respective processing of S105, S111, S121, S131 and S132 may be performed at any time after S102 and before S133. That is, the sequence of the processing may be changed and some processing may be performed at the same time.

Figure 6:
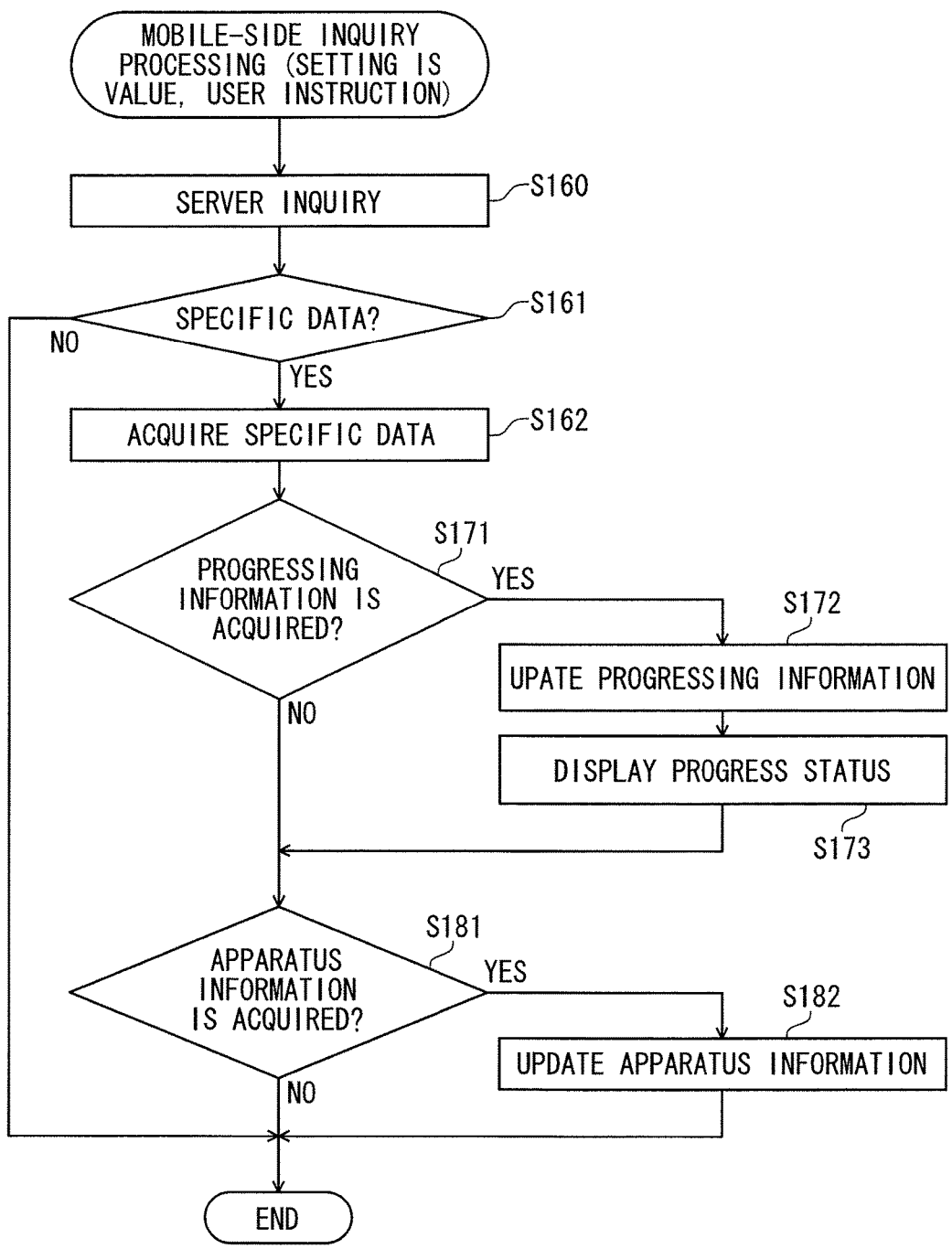
FIG. 6 is a flowchart showing a sequence of mobile-side inquiry processing that is to be executed by the mobile device.

Subsequently, a sequence of mobile-side inquiry processing in which the mobile device 200 monitors the server 300 is described with reference to a flowchart of FIG. 6. The mobile-side inquiry processing is executed by the CPU 81 when a setting for accessing the server 300 is valid or when an access instruction to the server 300 by the user is received through the operation panel 90.

In the meantime, as the setting for accessing the server 300, a setting for acquiring the progressing information and a setting for updating the apparatus information may be exemplified. The settings are set by the user and are stored in the HDD 84 of the mobile device 200. When the setting for acquiring the progressing information is valid, the mobile device 200 stores an instruction file including an execution instruction of the facsimile transmission in the storage area 320, and periodically executes the mobile-side inquiry processing until it is determined that the facsimile transmission is completed. When the setting for updating the apparatus information is valid, the mobile device 200 stores the instruction file including the upload instruction of the apparatus information in the storage area 320, and periodically executes the mobile-side inquiry processing until the latest apparatus information is downloaded.

In the mobile-side inquiry processing, the mobile device 200 first makes an inquiry to the server 300 (S160). Then, the mobile device 200 determines whether the specific data to the mobile device 200 is stored in the storage area 320 (S161). As the specific data, the progressing information may be exemplified when the setting for acquiring the progressing information is valid. For example, the apparatus information may be exemplified when the setting for updating the apparatus information is valid. When the access instruction by the user is received, the data, which is designated when the access instruction is received, may be exemplified. When the specific data is not stored (S161: NO), the mobile-side inquiry processing is terminated.

When the specific data is stored (S161: YES), the mobile device 200 acquires the specific data (S162). In the meantime, after storing the specific data in the RAM 83 or HDD 84 of the mobile device 200, the mobile device 200 deletes the specific data from the storage area 320. The processing of S162 is an example of the progressing acquisition processing.

After S162, the mobile device 200 determines whether the acquired specific data is the progressing information of the facsimile transmission by the MFP 100 (S171). The processing of S171 is an example of the information processing-side determination processing.

When the facsimile transmission starts, the MFP 100 stores the progressing information about the facsimile transmission in the storage area 320 at predetermined timing. Thus, when the progressing information is acquired (S171: YES), the mobile device 200 overwrites the acquired progressing information over the currently stored progressing information, thereby updating the progressing information (S172). Further, the mobile device 200 displays the progress status of the facsimile transmission on the operation panel 90 based on the acquired progressing information (S173). Thereby, the user is informed of the progress status of the facsimile transmission. The processing of S173 is an example of the progressing display processing.

After S173 or when the acquired specific data is not the progressing information (S171: NO), the mobile device 200 determines whether the apparatus information of the MFP 100 is acquired (S181). When the apparatus information of the MFP 100 is acquired (S181: YES), the mobile device 200 overwrites the acquired apparatus information over the currently stored apparatus information of the MFP 100, thereby updating the apparatus information of the MFP 100 (S182). After S182 or when the apparatus information of the MFP 100 is not acquired (S181: NO), the mobile-side inquiry processing is terminated.

Figure 7:
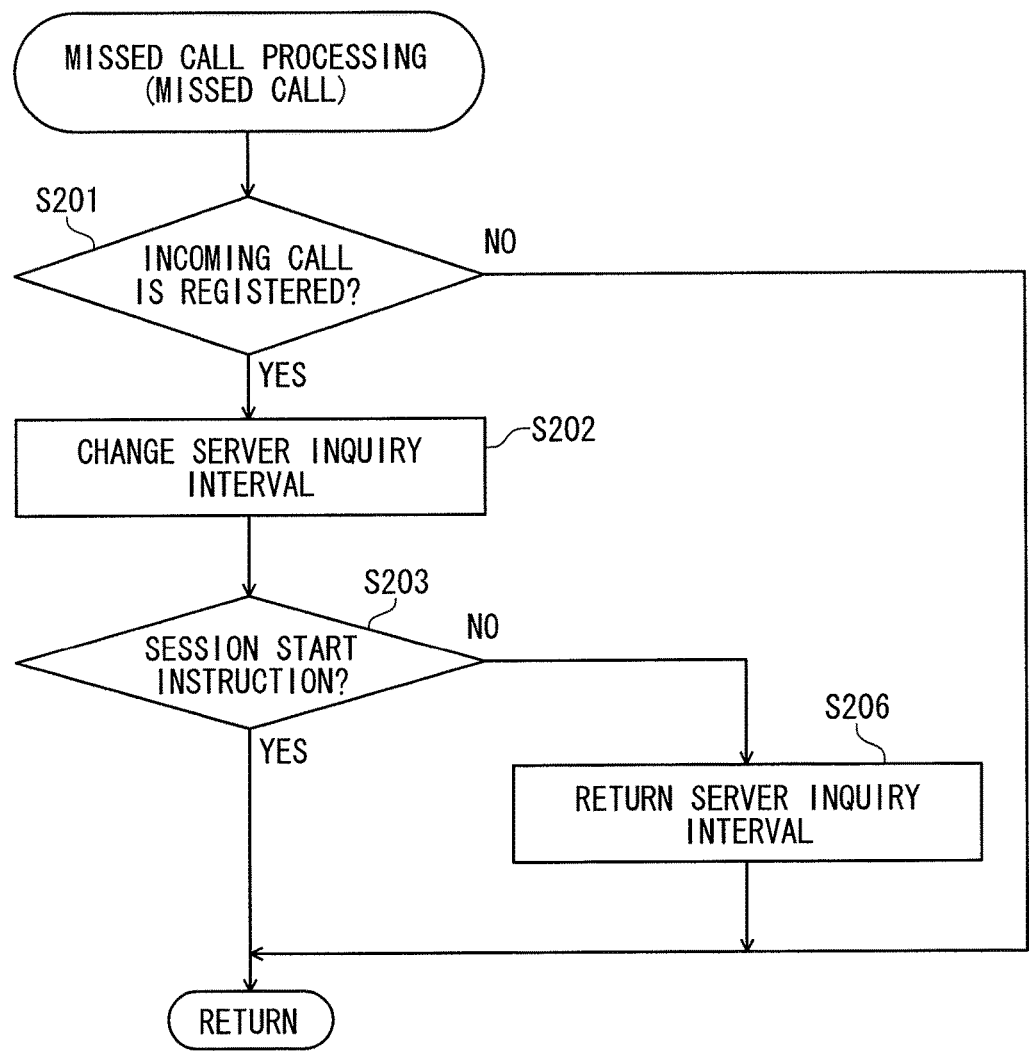
FIG. 7 is a flowchart showing a sequence of missed call processing that is to be executed by an MFP.

Subsequently, the control of the MFP 100 in the facsimile transmission service is described. First, a sequence of missed call processing is described with reference to a flowchart of FIG. 7. The missed call processing is executed by the CPU 31 when there is a missed call.

In the missed call processing, the MFP 100 first determines whether the telephone number of the incoming call is registered in the FAX transmission DB 210 (S201). The processing of S201 is an example of the incoming call determination processing. When the telephone number of the incoming call is not registered in the FAX transmission DB 210 (S201: NO), the missed call processing is terminated because a possibility that the missed call is a phone call based on the facsimile transmission service of the illustrative embodiment is low.

When the telephone number of the incoming call is registered in the FAX transmission DB 210 (S201: YES), there is a possibility that the missed call is a phone call based on the facsimile transmission service of the illustrative embodiment. For this reason, the interval at which the MFP 100 makes an inquiry to the server 300 is shortened (S202). That is, at a state where the facsimile transmission service is not enabled to start, the inquiry to the server 300 is made at a long interval such as every 10 minutes, every one hour, every one day and the like, thereby reducing the communication load. At a state where the facsimile transmission service is enabled to start, the inquiry to the server 300 is made at a short interval such as every 100 ms, every one second, every one minute and the like, thereby improving the responsiveness of the facsimile transmission service.

After S202, the MFP 100 determines whether an instruction file, in which the start of the session with the mobile device 200 is instructed, is stored, based on the first inquiry result to the server 300 (S203). When the instruction file is not stored (S203: NO), the MFP 100 returns the inquiry interval changed in S202 to the interval before the change (S206) and ends the missed call processing because it is possible to determine that the incoming call is not a phone call based on the facsimile transmission service of the illustrative embodiment. On the other hand, when the session is formed (S203: YES), the MFP 100 ends the missed call processing while keeping the inquiry interval because it is possible to determine that the incoming call is a phone call based on the facsimile transmission service of the illustrative embodiment.

Figure 8:
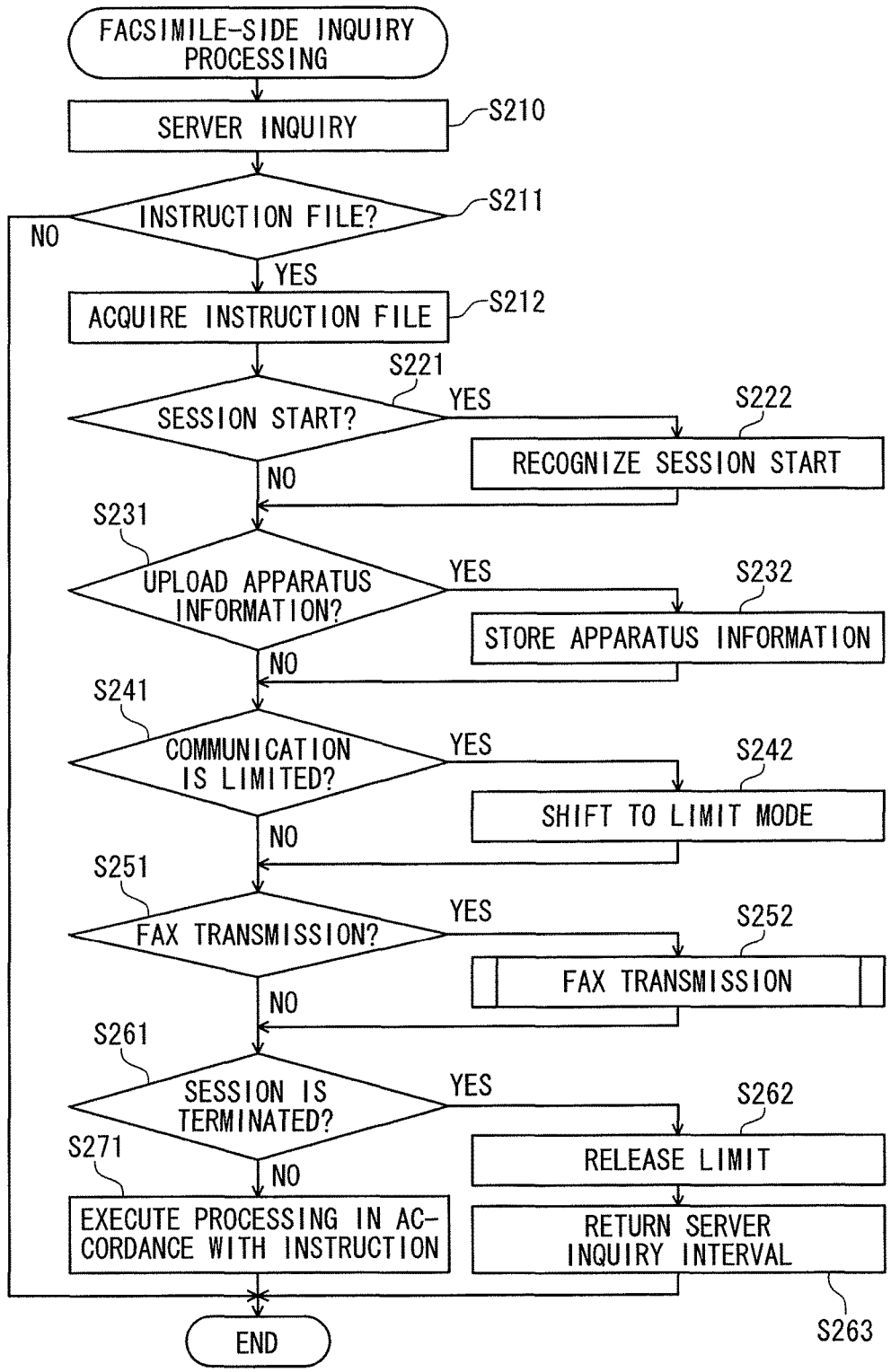
FIG. 8 is a flowchart showing a sequence of facsimile-side inquiry processing that is to be executed by the MFP.

Subsequently, a sequence of facsimile-side inquiry processing in which the MFP 100 monitors the server 300 is described with reference to a flowchart of FIG. 8. The facsimile-side inquiry processing is executed by the CPU 31 at the inquiry timing to the server 300.

In the facsimile-side inquiry processing, the MFP 100 first makes an inquiry to the server 300 (S210). Then, the MFP 100 determines whether the instruction file to the MFP 100 is stored in the storage area of the server 300, in which the data associated with the MFP 100 is stored (S211). The processing of S210 and S211 is an example of the facsimile-side determination processing. The MFP 100 determines whether or not the instruction file, including the storage area 320 in which the data associated with the MFP 100 and the user of the mobile device 200 is stored and the storage area in which the data associated with the MFP 100 and another user is stored. When the instruction file to the MFP 100 is not stored (S211: NO), the facsimile-side inquiry processing is terminated.

When the instruction file to the MFP 100 is stored (S211: YES), the MFP 100 acquires the instruction file and interprets instruction contents (S212). In the meantime, after storing the instruction file in the RAM 33 of the MFP 100, the MFP 100 deletes the instruction file from the storage area.

After S212, the MFP 100 executes the processing in accordance with the instruction contents of the instruction file. Hereinafter, the processing in accordance with the instruction relating to the file transmission service is described. First, the MFP 100 determines whether the instruction to start the session is included (S221). When the instruction to start the session is included (S221: YES), the MFP 100 recognizes the start of the session (S222).

After S222 or when the instruction to start the session is not included (S221: NO), the MFP 100 determines whether the instruction to upload the apparatus information of the MFP 100 is included (S231). When the instruction to upload the apparatus information of the MFP 100 is included (S231: YES), the MFP 100 stores the apparatus information of the MFP 100 in the storage area in which the instruction file is stored (S232).

After S232 or when the instruction to upload the apparatus information of the MFP 100 is not included (S231: NO), the MFP 100 determines whether the instruction to limit the communication is included (S241). When the instruction to limit an incoming call from the outside is included (S241: YES), the MFP 100 shifts to the limit mode (S242). The processing of S242 is an example of the limit processing.

After S242 or when the instruction to limit the communication is not included (S241: NO), the MFP 100 determines whether the instruction to execute the facsimile transmission including the readout of the image file and transmission information is included (S251). When the instruction to execute the facsimile transmission is included (S251: YES), the MFP 100 executes the facsimile transmission processing of executing the facsimile transmission (S252).

Here, a sequence of the facsimile transmission processing of S252 is described with reference to a flowchart of FIG. 9. Meanwhile, in the below descriptions, it is assumed that the facsimile transmission processing is executed in accordance with the instruction file stored in the storage area 320 of the server 300.

In the facsimile transmission processing, the MFP 100 first acquires the image file and transmission information from the storage area 320 in accordance with the instruction file (S253). The processing of S253 is an example of the acquisition processing. Further, the MFP 100 starts processing of preserving the progressing information of the facsimile transmission in the storage area 320 at predetermined timing (S254). As the progressing information, the start and completion of the facsimile transmission, an error occurrence and an error type when an error occurs, and a total number of pages and a number of pages of which transmission has been completed when transmitting image data of a plurality of pages may be exemplified. The processing of S254 is an example of the progressing storing processing.

After S254, the MFP 100 generates an image for facsimile based on the image file acquired in S253, and also generates facsimile data including the image (S255). Then, the MFP 100 tries connecting the facsimile communication to the facsimile apparatus of the transmission destination, based on the telephone number included in the transmission information acquired in S253 (S256). Then, the MFP 100 determines whether the facsimile communication is established (S257).

When the facsimile communication is not established due to the call waiting, for example (S257: NO), the MFP 100 determines whether or not to stop the facsimile transmission (S258). The determination as to whether to stop the facsimile transmission is set in advance in the MFP 100. When the facsimile transmission is not stopped, i.e., when continuing the facsimile transmission (S258: NO), the MFP 100 returns to S256 and again tries the connection of the facsimile communication. On the other hand, when stopping the facsimile transmission (S258: YES), the MFP 100 ends the facsimile transmission processing. In the meantime, when the facsimile communication is not established even though the retrial is performed several times, the facsimile transmission processing may be terminated. The processing of S258 (YES) is an example of the facsimile stop processing, and the processing of S258 (NO) is an example of the facsimile continuing processing.

When the facsimile communication is established (S257: YES), the MFP 100 starts the facsimile transmission of the facsimile data generated in S255 (S259). The processing of S259 is an example of the transmission processing. After S259, the facsimile transmission processing is terminated.

Returning to FIG. 8, after the facsimile transmission processing of S252 or when the instruction to execute the facsimile transmission is not included (S251: NO), the MFP 100 determines whether the instruction to end the session is included (S261). When the instruction to end the session is included (S261: YES), the MFP 100 cancels the limit mode if the MFP 100 is in the limit mode (S262). The MFP 100 returns the inquiry interval to the server 300 changed in S202 of the missed call processing to the original interval (S263).

When the instruction to end the session is not included (S261: NO), the MFP 100 executes processing different from the above-described processing, in accordance with the instruction contents (S271). After S271 or S263, the facsimile-side inquiry processing is terminated.

As described above, according to the facsimile communication system 900 of the illustrative embodiment, the mobile device 200 stores the transmission information and image file acquired by the user's operation in the server 300. The server 300 stores the transmission information and the image file in the storage area 320 associated with the telephone number of the facsimile apparatus. The MFP 100 makes an inquiry to the server 300 about whether the transmission information and the image file are stored, based on the telephone number of the MFP 100. Then, when it is determined that the transmission information and the image file are stored in the server 300, based on the inquiry, the MFP 100 acquires the transmission information and the image file from the server 300 and performs facsimile transmission. That is, according to this configuration, the transmission information and image file freely set at the mobile device 200 by the user are transmitted to the MFP 100 through the server 300, in correspondence to the inquiry from the MFP 100. For this reason, it is possible to perform facsimile transmission having a high degree of freedom.

The illustrative embodiment is just exemplary, not to limit the present disclosure. Therefore, the present disclosure can be variously improved and modified without departing from the gist of the present disclosure. For example, the apparatus configured to perform facsimile transmission has only to have the facsimile communication function, and a multi function peripheral, a PC having the facsimile communication function and the like may be used, in addition to the MFP. The information processing apparatus configured to instruct the facsimile transmission is not limited to the mobile device, and may be a desktop PC.

Also, in the illustrative embodiment, the image file and the like are transmitted using the instruction file. However, the image file and the like may be transmitted without using the instruction file. For example, the server 300 may be provided with a storage area for a facsimile apparatus to which the MFP 100 makes an inquiry, and a storage area for a mobile device to which the mobile device 200 makes an inquiry, and when the data is stored in the storage area for the facsimile apparatus, the MFP 100 may acquire all the data and perform facsimile transmission in accordance with the data.

Also, in the illustrative embodiment, the storage area 320 is associated with the user ID and the ID of the facsimile apparatus. However, the ID of the mobile device, for example, the telephone number of the mobile device may be used instead of the user ID. The storage area 320 may be associated with only the ID of the facsimile apparatus. However, when the storage area 320 is associated with the user ID or the ID of the mobile device, too, it is possible to limit the using of the storage area by unspecified users, so that the confidentiality of the image file to be stored in the storage area 320 is improved.

Also, in the illustrative embodiment, the dialing is made from the mobile device 200 to the MFP 100, so that the inquiry interval of the MFP 100 to the server 300 is shortened. However, a configuration where an inquiry is not made before the MFP 100 starts the facsimile transmission service, and the inquiry is enabled to start when receiving a phone call from the mobile device 200 is also possible. This case is also an example of changing the inquiry interval.

Also, in the illustrative embodiment, the dialing is made from the mobile device 200 to the MFP 100, so that the inquiry interval of the MFP 100 to the server 300 is changed. However, the inquiry interval may not be changed. In this case, the dialing from the mobile device 200 to the MFP 100 is not required.

Also, regarding the method of changing the inquiry interval, a configuration where an instruction file to shorten the inquiry interval is stored in the storage area 320 by the mobile device 200 and the MFP 100 changes the inquiry interval in accordance with the instruction file is also possible.

The processing disclosed in the illustrative embodiment may be executed by the hardware such as a single CPU, a plurality of CPUs, an ASIC and the like or a combination thereof. The processing disclosed in the illustrative embodiment may be implemented as a variety of aspects such as a recording medium having a program for executing the processing recorded therein, a method and the like.

What is claimed is:

1. A first facsimile apparatus comprising:
    a first interface configured to perform facsimile communication;
    a second interface configured to establish a connection to a network;
    a processor; and
    memory storing computer readable instructions that, when executed by the processor, causing the apparatus to perform:
        inquiry processing of making an inquiry to a communication server through the second interface for determining whether an image data file and a telephone number of a second facsimile apparatus to which the image data file is to be transmitted are associated with identification information for identifying the first facsimile apparatus in a storage area of the communication server;
        facsimile-side determination processing of determining, by using a response to the inquiry, whether the image data file and a telephone number of a second facsimile apparatus to which the image data file is to be transmitted are associated with the identification information for identifying the first facsimile apparatus in the storage area of the communication server, the image data file and the telephone number being stored in the storage area of the communication server associated with identification information of a user and identification information of the first facsimile apparatus, in accordance with an operation of the terminal apparatus by the user and received at the communication server from the terminal apparatus;
        acquisition processing of, when it is determined in the facsimile-side determination processing that image data file and the telephone number that are provided to the communication server from the terminal apparatus are stored in the communication server by being associated with the identification information, acquiring the image data file and the telephone number from the communication server through the second interface; and
        transmission processing of transmitting facsimile data including the image data file to the second facsimile apparatus specified by the telephone number through the first interface.

2. The first facsimile apparatus according to claim 1,
    wherein the memory stores the computer readable instructions that, when executed by the processor, further cause the apparatus to perform:
        progress storing processing of storing a progress status of the transmission processing in the communication server through the second interface.

3. The first facsimile apparatus according to claim 1,
    wherein the memory stores the computer readable instructions that, when executed by the processor, further cause the apparatus to perform:
        storing processing of storing in the communication server an own apparatus information including at least one of information identifying transmission capability of the first facsimile apparatus, a telephone directory, a telephone history of outgoing calls and incoming calls, and a facsimile history of transmitting and receiving facsimile data through the first interface.

4. The first facsimile apparatus according to claim 1,
    wherein the first interface is configured to be connectable with a telephone line,
    wherein the first facsimile apparatus further comprises a storage unit configured to store therein a telephone number of the terminal apparatus, and
    wherein the memory stores the computer readable instructions that, when executed by the processor, further cause the apparatus to perform:
        incoming call determination processing of determining whether an incoming call of a specific phone call made by the terminal apparatus after the terminal apparatus receives an operation relating to the facsimile transmission is made through the first interface, based on the telephone number stored in the storage unit; and
        in the inquiry processing, periodically making the inquiry to the communication server at a first time interval, and when it is determined that there is an incoming call of the specific phone call, changes an inquiry interval, at which the inquiry is made to the communication server, to a second time interval that is shorter than the first time interval.

5. The first facsimile apparatus according to claim 4,
    wherein the memory stores the computer readable instructions that, when executed by the processor, further cause the apparatus to perform:
        limiting processing of limiting usage of the first interface after it is determined in the incoming call determination processing that there is an incoming call of the specific phone call.

6. The first facsimile apparatus according to claim 1,
    wherein the memory stores the computer readable instructions that, when executed by the processor, further cause the apparatus to perform:
        time information storing processing of storing, in the communication server, at least one of an inquiry interval, at which the inquiry is periodically made to the communication server in the inquiry processing, and a time at which the inquiry is to be made to the communication server next time in the inquiry processing.

7. The first facsimile apparatus according to claim 1,
wherein the memory stores the computer readable instructions that, when executed by the processor, further cause the apparatus to perform:
   facsimile stop processing of stopping the facsimile transmission to the second facsimile apparatus when facsimile communication with the second facsimile apparatus is not established in the transmission processing.

8. The first facsimile apparatus according to claim 1,
wherein the memory stores the computer readable instructions that, when executed by the processor, further cause the apparatus to perform:
   facsimile continuing processing of continuing to retry establishing the facsimile communication until the facsimile communication with the second facsimile apparatus is established.

9. The first facsimile apparatus according to claim 1,
wherein the memory stores the computer readable instructions that, when executed by the processor, further cause the apparatus to perform:
   in the inquiry processing, making an inquiry about whether an instruction file, in which an instruction to acquire the image data file and the telephone number is recorded, is stored;
   in the facsimile-side determination processing, determining that the image data file and the telephone number are stored in the communication server when the instruction file is stored; and
   in the acquisition processing, acquiring the image data file and the telephone number from the communication server based on the instruction file.

10. The facsimile apparatus according to claim 1, wherein the inquiry determines whether the image data file and the telephone number of another facsimile device to which the image file is to be transmitted are associated with identification information for identifying the facsimile apparatus in the storage area of the communication server.

11. A non-transitory computer readable recording medium storing computer readable instructions for a terminal apparatus that is provided with a processor, wherein the instructions, when executed by the processor, cause the terminal apparatus to perform:
   image selection processing of selecting an image file as a transmission target of facsimile transmission;
   transmission source acquisition processing of acquiring identification information of a transmission source facsimile apparatus, which is a facsimile apparatus of a transmission source of the facsimile transmission;
   setting processing of setting transmission information including a telephone number of a transmission destination facsimile apparatus, which is a facsimile apparatus of a transmission destination of the facsimile transmission; and
   storing processing of storing, in a storage area of a communication server that is different from the transmission destination facsimile apparatus, the image file selected in the image selection processing to be transmitted from the transmission source facsimile apparatus to the transmission destination facsimile apparatus and the telephone number set in the setting processing in association with identification information of a user of the terminal apparatus and the identification information of the transmission source facsimile apparatus acquired in the transmission source acquisition processing to supply the image file and telephone number from the terminal apparatus to the transmission source facsimile apparatus via the communication server, the telephone number being a number used for communicating image data via facsimile.

12. The non-transitory computer readable recording medium according to claim 11,
wherein the instructions, when executed by the processor, cause the terminal apparatus to further perform:
   information processing side determination processing of determining whether a progress status of the facsimile transmission by the transmission source facsimile apparatus is stored in the communication server by being associated with the identification information acquired in the transmission source acquisition processing;
   progressing acquisition processing of acquiring the progress status from the communication server; and
   progress display processing of displaying the progress status acquired in the progressing acquisition processing on a display unit of the terminal apparatus.

13. The non-transitory computer readable recording medium according to claim 11,
wherein the instructions, when executed by the processor, causing the terminal apparatus to perform the information processing side determination processing after storing the image file and the transmission information in the storage area of the communication server in the storing processing.

14. The non-transitory computer readable recording medium according to claim 11,
wherein the instructions, when executed by the processor, cause the terminal apparatus to further perform:
   determining processing of determining whether at least one information identifying transmission capability of the transmission source facsimile apparatus, a telephone directory provided in the transmission source facsimile apparatus, a telephone history of an outgoing calls and incoming calls of the transmission source facsimile apparatus, and a facsimile history of transmitting and receiving facsimile data of the transmission source facsimile apparatus is stored in the communication server; and
   facsimile information display processing of reading out the information stored in the communication server and displaying the information on a display unit of the terminal apparatus when it is determined in the determining processing that the information is stored in the communication server.

15. The non-transitory computer readable recording medium according to claim 11,
wherein the instructions, when executed by the processor, cause the terminal apparatus to further perform:
   telephone call stop processing of stopping to make a telephone call to the transmission source facsimile apparatus when the telephone call with the transmission source facsimile apparatus is not established in the telephone call processing.

16. The non-transitory computer readable recording medium according to claim 11,
wherein the instructions, when executed by the processor, cause the terminal apparatus to further perform:
   retry processing of continuing to retry establishing a telephone communication with the transmission source facsimile apparatus when the telephone call is not established in the telephone call processing.

17. The non-transitory computer readable recording medium according to claim 11,
wherein the instructions, when executed by the processor, cause the terminal apparatus to further perform:
in storing processing, storing in the storage area of the communication server an instruction file in which an instruction to acquire the image file and the transmission information is recorded.

18. A communication server comprising:
an interface that is capable of establishing an Ethernet communication;
a storage unit;
a processor; and
memory storing computer readable instructions that, when executed by the processor, cause the communication server to perform:
allocating processing of allocating, in the storage unit based on identification information for identifying a first facsimile apparatus, a storage area in which a telephone number of a second facsimile apparatus, which is a facsimile apparatus of a transmission destination of a facsimile transmission from the first facsimile apparatus and an image file to be transmitted from the first facsimile apparatus to the second facsimile apparatus by the facsimile transmission are stored;
server storing processing of acquiring the telephone number of the second facsimile apparatus and the image file from a terminal apparatus through the interface and storing the telephone number and the image file in association with identification data of a user of the terminal apparatus and identification information of the first facsimile apparatus in the storage area of the storage unit of the communication server that is different from the second facsimile apparatus, the telephone number being a number used for communicating image data via facsimile; and
server transmission processing of, after the terminal apparatus receives a facsimile transmission instruction, in response to an inquiry from the first facsimile apparatus through the interface without the first facsimile apparatus performing the communication with the terminal apparatus transmitting the image file and the telephone number that are received from the terminal apparatus and stored in the storage area to the first facsimile apparatus through the interface.

19. A facsimile apparatus comprising:
a first interface configured to perform facsimile communication;
a second interface configured to establish a connection to a network;
a processor; and
memory storing computer readable instructions that, when executed by the processor, cause the apparatus to perform:
inquiry processing of making an inquiry to a communication server through the second interface;
facsimile-side determination processing of determining whether an image file as a data to be transmitted and transmission information including destination information to which the image file is to be transmitted by the facsimile apparatus are associated with identification information for identifying the facsimile apparatus and stored in the communication server, the image file and the transmission information being stored in the communication server in accordance with an operation of an information processing apparatus by a user;
acquisition processing of, when it is determined in the facsimile-side determination processing that image file and the transmission information are stored in the communication server by being associated with the identification information, acquiring the image file and the transmission information from the communication server through the second interface; and
transmission processing of transmitting facsimile data including the image file to another facsimile apparatus specified by the transmission information through the first interface;
wherein the communication server further stores an instruction information including an instruction to execute the facsimile transmission including a readout instruction of the image file and the transmission information and a facsimile transmission instruction based on the read image file, the instruction information being generated by the information processing apparatus and stored in the communication server, and
wherein the memory stores the computer readable instructions that, when executed by the processor, further causing the apparatus to perform:
determining whether an instruction information to the facsimile apparatus is stored in the communication server;
in response to determining that the instruction information is stored in the server, acquiring the instruction information from the communication server through the second interface and interpreting instruction contents in the instruction information;
in the acquisition processing, in response to interpreting that the instruction to execute facsimile transmission is included in the instruction information acquired from the communication server, acquiring the image file and the transmission information from the communication server through the second interface in accordance with the instruction information; and
the transmission processing of transmitting facsimile data including the image file to another facsimile apparatus specified by the transmission information through the first interface.

20. A non-transitory computer readable recording medium storing computer readable instructions for an information processing apparatus that is provided with a processor, wherein the instructions, when executed by the processor, cause the information processing apparatus to perform:
image selection processing of selecting an image file as a transmission target of facsimile transmission;
transmission source acquisition processing of acquiring identification information of a transmission source facsimile apparatus, which is a facsimile apparatus of a transmission source of the facsimile transmission;
setting processing of setting transmission information including destination information of a transmission destination facsimile apparatus, which is a facsimile apparatus of a transmission destination of the facsimile transmission; and
storing processing of storing, in a storage area of a communication server that is different from the transmission destination facsimile apparatus, the image file selected in the image selection processing and the transmission information set in the setting processing in association with the identification information acquired in the transmission source acquisition processing;

in the storing processing, storing the selected image file and the set transmission information in a storage area of the communication server;

generating an instruction information including an instruction to execute the facsimile transmission including a readout instruction of the image file and the transmission information and a facsimile transmission instruction based on the read image file; and transmitting, to the communication server, the generated instruction information so as to store the generated instruction information in the storage area of the communication server.

21. A communication server comprising:

an interface that is capable of establishing an Ethernet communication;

a storage unit;

a processor; and memory storing computer readable instructions that, when executed by the processor, cause the communication server to perform:

allocating processing of allocating, in the storage unit based on identification information for identifying a facsimile apparatus, a storage area in which transmission information including destination information of a transmission destination facsimile apparatus, which is a facsimile apparatus of a transmission destination of a facsimile transmission from the facsimile apparatus and an image file to be transmitted by the facsimile transmission are stored;

server storing processing of acquiring the transmission information and the image file from an information processing apparatus through the interface and storing transmission information in the storage area of the storage unit of the communication server that is different from the transmission destination apparatus; and server transmission processing of, after the information processing apparatus receives a facsimile transmission instruction, in response to an inquiry from the facsimile apparatus through the interface, transmitting the image file and the transmission information stored in the storage area to the facsimile apparatus through the interface;

wherein the communication server further stores an instruction information including an instruction to execute the facsimile transmission, and wherein the instructions, when executed by the processor, causing the communication server to perform:

in the server storing processing, after acquiring the transmission information and the image file, acquiring the instruction information including the facsimile transmission instruction from the information processing apparatus through the interface and storing the instruction information in the storage area; and in the server transmission processing, after the information processing apparatus receives the facsimile transmission instruction, in response to an inquiry from the facsimile apparatus through the interface, transmitting the instruction information stored in the storage area to the facsimile apparatus through the interface and then transmitting the image file and the transmission information stored in the storage area to the facsimile apparatus through the interface.

* * * * *